US009077560B2

(12) United States Patent
Harrison et al.

(10) Patent No.: US 9,077,560 B2
(45) Date of Patent: *Jul. 7, 2015

(54) ADAPTATION SCHEME FOR COMMUNICATIONS TRAFFIC

(75) Inventors: Neil Harrison, Boughton (GB); Alan McGuire, Felixstowe (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1356 days.

This patent is subject to a terminal disclaimer.

(21) Appl. No.: 12/808,823

(22) PCT Filed: Dec. 19, 2008

(86) PCT No.: PCT/GB2008/004210
§ 371 (c)(1),
(2), (4) Date: Jun. 17, 2010

(87) PCT Pub. No.: WO2009/081128
PCT Pub. Date: Jul. 2, 2009

(65) Prior Publication Data
US 2010/0309930 A1 Dec. 9, 2010

Related U.S. Application Data

(63) Continuation-in-part of application No. 12/004,080, filed on Dec. 20, 2007, now Pat. No. 8,102,876.

(30) Foreign Application Priority Data

Dec. 20, 2007 (GB) .................... 0724936.0
Jan. 14, 2008 (GB) .................... 0800572.0
Jan. 14, 2008 (GB) .................... 0800573.8
Jul. 31, 2008 (GB) .................... 0814056.8

(51) Int. Cl.
H04J 3/22 (2006.01)
H04J 3/24 (2006.01)
(Continued)

(52) U.S. Cl.
CPC .......... *H04L 12/4633* (2013.01); *H04L 12/413* (2013.01)

(58) Field of Classification Search
CPC .................................................. H04L 29/0653
See application file for complete search history.

(56) References Cited

U.S. PATENT DOCUMENTS 6,937,571 B1 8/2005 Acharya et al.
6,963,561 B1 11/2005 Lahat
(Continued)

FOREIGN PATENT DOCUMENTS

CN 1984028 A 6/2007
EP 1 603 304 A 12/2005
(Continued)

OTHER PUBLICATIONS

International Search Report for PCT/GB2008/004226 mailed Apr. 21, 2009.
(Continued)

Primary Examiner — Samina Choudhry
(74) Attorney, Agent, or Firm — Nixon & Vanderhye PC

(57) ABSTRACT

A method of generating a generic framing procedure hierarchy comprising processing a first generic framing procedure frame to determine the overall length of the generic framing procedure frame, mapping the frame into the generic framing procedure payload area of a second generic framing procedure frame at the next level of the generic framing procedure hierarchy, whereby information enabling the size of the generic framing procedure payload remaining after that frame has been extracted is captured in the header fields of the generic framing procedure frame into which the first frame is encapsulated, and wherein the generic framing procedure header indicates whether there are more frames left in the mapping hierarchy when de-encapsulating (i.e., running down) the generic framing procedure frame stack by providing an indicator at level N of the hierarchy that at the level N−1 there is a generic framing procedure frame to extract.

14 Claims, 12 Drawing Sheets

PTI: Payload Type Identifier
PFI: Payload FCS Indicator
EXI: Extension Header Identifier
UPI: User Payload Identifier

(51) Int. Cl.
*H04L 12/46* (2006.01)
*H04L 12/413* (2006.01)

(56) References Cited

U.S. PATENT DOCUMENTS

| | | |
|---|---|---|
| 7,212,534 B2 | 5/2007 | Kadambi et al. |
| 7,756,035 B2 | 7/2010 | Bragg et al. |
| 8,102,876 B2 | 1/2012 | McGuire |
| 2002/0083190 A1 | 6/2002 | Kamiya et al. |
| 2005/0053064 A1* | 3/2005 | Wang .................... 370/389 |
| 2005/0238049 A1 | 10/2005 | Delregno |
| 2005/0271066 A1 | 12/2005 | Valadarsky |
| 2007/0098006 A1 | 5/2007 | Parry et al. |
| 2007/0116046 A1 | 5/2007 | Liu et al. |
| 2008/0037581 A1 | 2/2008 | Asano |
| 2008/0117895 A1* | 5/2008 | De Heer .................. 370/389 |
| 2008/0232366 A1 | 9/2008 | He |
| 2010/0309924 A1 | 12/2010 | Harrison et al. |
| 2010/0309930 A1 | 12/2010 | Harrison et al. |
| 2012/0039341 A1 | 2/2012 | Latif et al. |

FOREIGN PATENT DOCUMENTS

| | | |
|---|---|---|
| EP | 1 603 307 | 12/2005 |
| EP | 1 657 839 | 5/2006 |
| WO | 2009/081139 A1 | 7/2009 |

OTHER PUBLICATIONS

Loring Wirbel, "Navy terminals support GFP" EE-Times, Dec. 19, 2005, p. 1.1, XP002522216, Colorado Springs, Colorado (1 pg.).

International Search Report for PCT/GB2008/004210, mailed Apr. 15, 2009.

Generic framing procedure (GFP): G.7041/Y.1303 (Aug. 2005), *ITU-T Standard in Force (I), International Telecommunication Union,* Aug. 2005 XP017404569 (entire document).

* cited by examiner

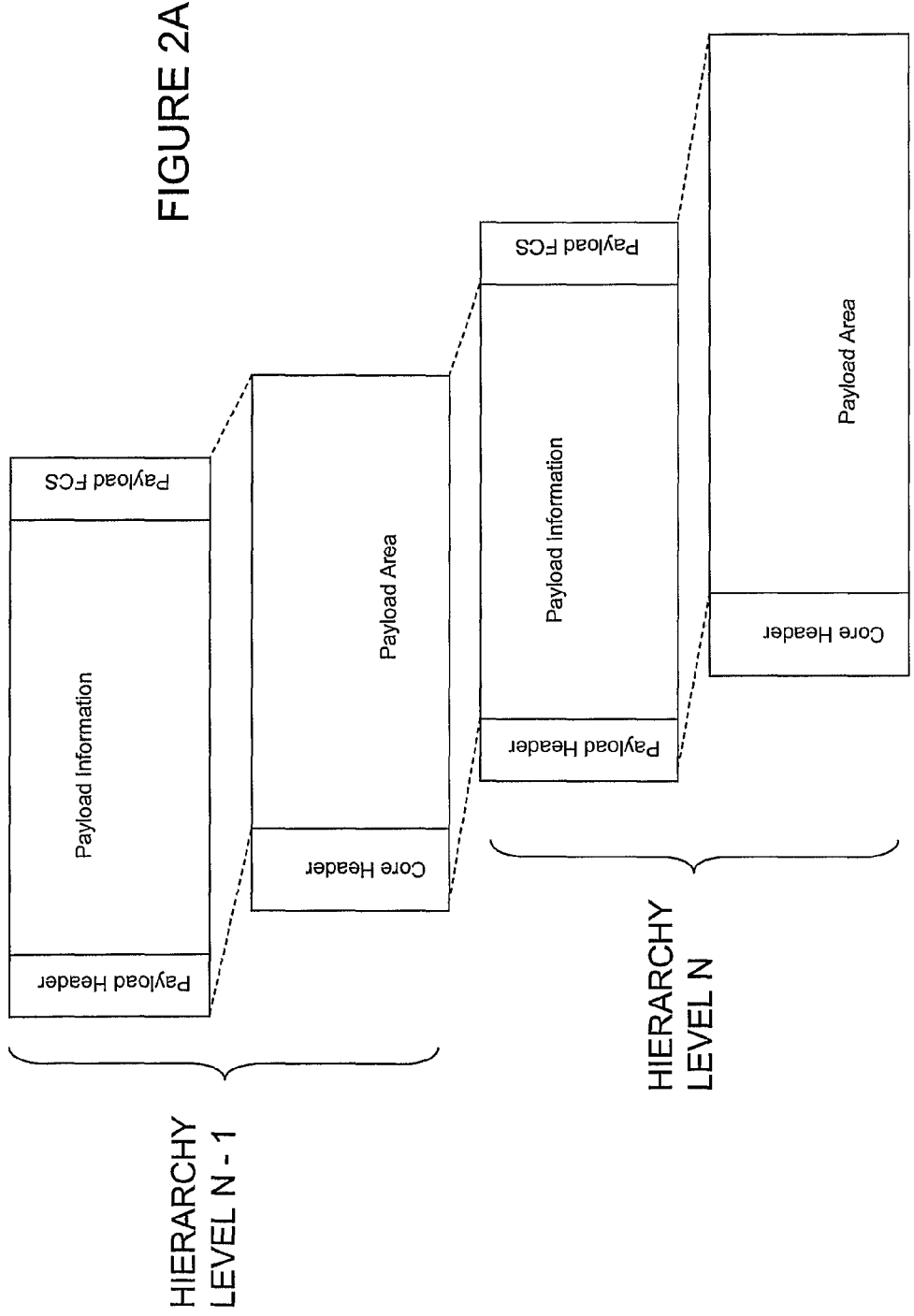

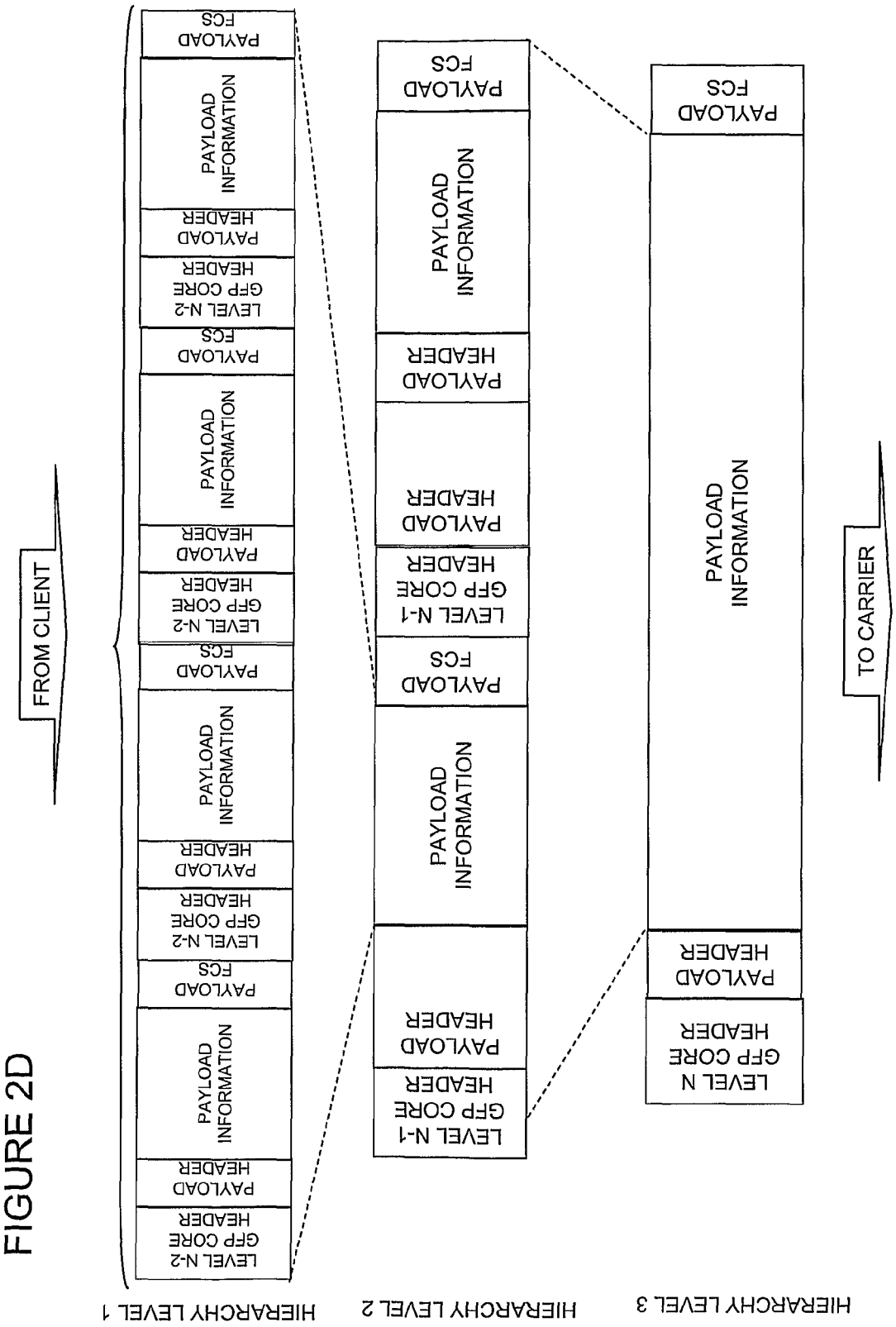

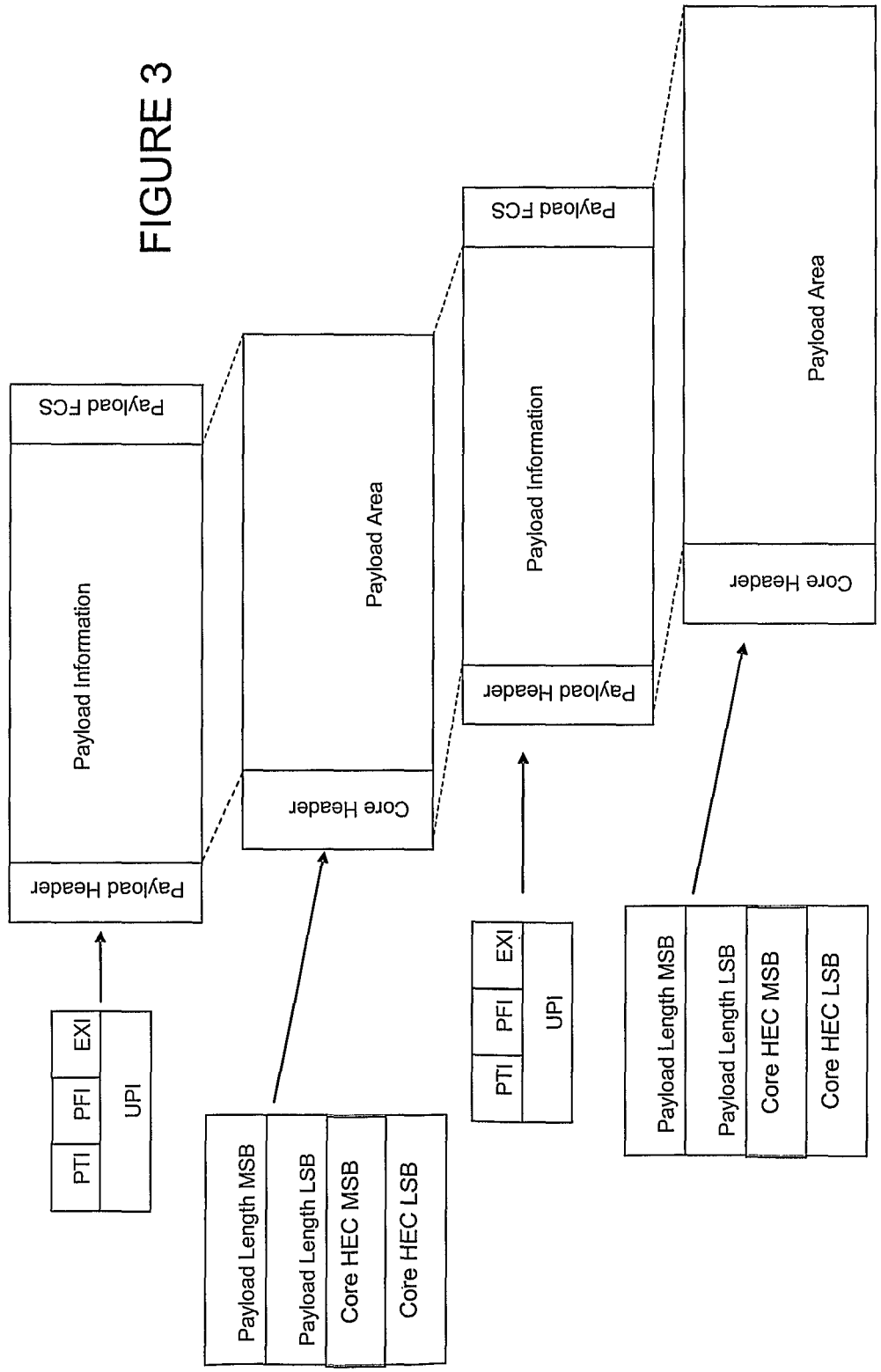

ADAPTATION SCHEME FOR COMMUNICATIONS TRAFFIC

This application is the U.S. national phase of International Application No. PCT/GB2008/004210 filed 19 Dec. 2008 which designated the U.S. and claims priority to GB Patent Application No. 0724936.0 filed 20 Dec. 2007, U.S. patent application Ser. No. 12/004,080 filed 20 Dec. 2007 to which the current application is a continuation-in-part of, GB Patent Application Nos. 0800573.8 filed 14 Jan. 2008, 0800572.0 filed 14 Jan. 2008 and 0814056.8 filed 31 Jul. 2008, the entire contents of each of which are hereby incorporated by reference.

The present invention relates to a method of forming a hierarchy of stacked GFP (Generic Framing Procedure) frames.

In particular, but not exclusively, the GFP hierarchy is capable of providing an adaptation layer for the Ethernet communications protocol. The GFP adaptation layer enables a variety of client traffic to be carried across a carrier Ethernet network without requiring each type of client traffic to be indicated in the Ethernet frame header.

In particular but not exclusively, the invention relates to a method of enabling GFP to be carried over GFP so as to separate out the control domains of different operators of a communications network and/or enable GFP multiplexing.

BACKGROUND

European Patent Application EP 181068 entitled "Method and Device for Generic Framing Procedure Encapsulation" describes how a plurality of protocol data units (PDUs) can be cascaded into a cascaded packet which is then encapsulated in a GFP frame. A device for GFP encapsulation is also described which comprises a cascading module for cascading a plurality of PDUs to form a cascade packet and a GFP encapsulation module for encapsulating the cascade packet to obtain a GFP packet. The technique proposed by EP 181068 increases the occupation rate of the payload in a single GFP frame to improve transmission efficiency.

In order to extract a packet from a cascaded packet, however, the entire cascaded packet must be un-cascaded in EP 181068.

United States Published Patent Application US2004/0252720 describes a technique for providing multiple Fibre Channel (FC) frames in one frame-mapped GFP transport frame which follows GFP conventions except that a Distributed Delimiter marks each FC frame in the payload of the GFP transport frame.

United States published Patent Application US2005/0169275 describes a method for transmitting high-level PDUs over low-level protocols, and in particular describes how Multi-protocol label switching PDUs can be transmitted by adding a pending MPLS PDU to the payload information area (PIA) of a GFP data frame; transmitting the GFP data frame to the destination node via a transmission network, and retrieving the MPLS PDU from the PIA field of the GFP data frame at the destination node.

However, it is desirable to be able to extract a single encapsulated traffic unit from a plurality of traffic units which are carried within a carrier GFP frame without requiring all of the other traffic units to be extracted from the GFP frame.

SUMMARY STATEMENTS OF THE INVENTION

One aspect of the invention seeks to provide a method of adapting client data for transportation in a communications system, the method comprising:

receiving a client frame conforming to a generic framing procedure communications protocol; and mapping the client frame to the payload area of one or more carrier frames, each carrier frame conforming to a generic framing procedure communications protocol.

The carrier generic framing procedure frames may be mapped to the payload area of a protocol data unit of the communications protocol used by a carrier network of said communications system.

The carrier network communications protocol may comprise an Ethernet communications protocol. Alternatively, the carrier network communications protocol comprises an MPLS communications protocol.

A generic framing procedure frame may comprise a header having an extension field arranged to indicate the fragmentation status of its payload and the sequence number of a payload fragment.

A generic framing procedure frame may comprise a header having an extension field arranged to indicate a channel identity of its payload.

Another aspect of the invention seeks to provide a method of adapting client data for transportation in a communications system, the method comprising: receiving a client frame conforming to a generic framing procedure communications protocol; mapping the client frame to the payload area of a plurality of carrier frames, each carrier frame conforming to a generic framing procedure communications protocol and having an extension field arranged to indicate the fragmentation status of its payload and the sequence number of a payload fragment.

A method of reassembling a client from fragmented data transported over a communications system, the method comprising: receiving a plurality of carrier frames conforming to a generic framing procedure communications protocol; processing an extension field of a header of each of the plurality of carrier frames to determine if it indicates the fragmentation status of its payload and the sequence number of a payload fragment; if a plurality of fragments of the same client frame are detected, processing the plurality of frames to extract each payload fragment; reassembling the client frame from said payload fragments.

The method may be implemented on a node in the communications network arranged to provide an aggregation service to multiplex client traffic received from lower rate ports to a carrier network accessed through one or more higher rate ports of the node, the method comprising: receiving a plurality of client frames from a plurality of lower rate ports, mapping the client traffic into the payload area of one or more of said client generic framing procedure communications protocol frames; wherein when mapping each client generic framing procedure frame to the payload information area of a carrier frame, each carrier frame conforming to a generic framing procedure communications protocol has an extension field arranged to indicate the channel number of its payload, and wherein each carrier generic framing procedure frame is mapped to the payload area of a protocol data unit of the carrier network communications protocol.

The method may be arranged to provide an aggregation service to multiplex traffic from lower rate ports to higher rate ports, the method comprising: receiving a plurality of client frames conforming to a generic framing procedure communications protocol from a plurality of lower rate ports; mapping each client frame to the payload information area of a carrier frame, each carrier frame conforming to a generic framing procedure communications protocol and having an extension field arranged to indicate the channel number of its payload.

Another aspect of the invention seeks to provide a method of generating a generic framing procedure hierarchy comprising: processing a first generic framing procedure frame to determine the overall length of the generic framing procedure frame; mapping the frame into the generic framing procedure payload area of a second generic framing procedure frame at the next level of the generic framing procedure hierarchy, whereby information enabling the size of the generic framing procedure payload remaining after that frame has been extracted is captured in one or more of the fields in the header of the generic framing procedure frame into which the first frame is encapsulated.

The generic framing procedure header indicator may indicate whether there are more frames left in the mapping hierarchy when de-encapsulating the generic framing procedure frame stack.

The header indicator may provide an indicator at level N of the hierarchy that at the N−1 level there is a generic framing procedure frame to extract.

Another indicator in the payload header may indicate that there are no more generic framing procedure frames to extract and the hierarchy of generic framing procedure frames is terminated.

Another aspect of the invention seeks to provide a method of restoring client data which has been adapted for transportation in a communications system using any of the above methods, the method comprising: processing at a node in said communications system a received frame to determine if its payload comprises a frame conforming to a generic framing procedure communications protocol; and if the payload is a generic framing procedure communications protocol frame:
  i) de-encapsulating the payload;
  ii) processing the header fields of the de-encapsulated generic framing procedure frame; and
  iii) determining if the payload further comprises one or more generic framing procedure communications protocol frames, and if so,
  repeating the above steps i) to iii).

The method may further comprise:
processing one or more extension fields of a header of each de-encapsulated generic framing procedure frame to determine if a channel identifier is present indicating the channel identity of the client signal from which the payload is derived.

The method may further comprise:
processing one or more extension fields of a header of each generic framing procedure frame to determine if one or more values of said extension fields are present which indicate the fragmentation status of its payload and the sequence number of a payload fragment.

The method may further comprise, if a plurality of fragments of the same client frame are detected:
processing the plurality of frames to extract each payload fragment;
reassembling the original payload from said payload fragments.

Another aspect of the invention seeks to provide apparatus comprising one or more components arranged to implement steps in any of the above method aspects.

One aspect of the invention seeks to provide apparatus comprising:
  a processor arranged to process a first generic framing procedure frame to determine the overall length of the generic framing procedure frame;
  a mapper arranged to encapsulate the first frame into the generic framing procedure payload area of a second generic framing procedure frame at the next level of the generic framing procedure hierarchy,
  whereby information enabling the size of the generic framing procedure payload remaining after that frame has been extracted is captured in the header fields of the generic framing procedure frame into which the first frame is encapsulated.

The generic framing procedure header indicator indicates whether there are more frames left in the mapping hierarchy when de-encapsulating the generic framing procedure frame stack.

One aspect of the invention seeks to provide a method of generating a generic framing procedure hierarchy comprising:
  processing a first generic framing procedure frame to determine the overall length of the generic framing procedure frame; and
  mapping the frame into the generic framing procedure payload area of a second generic framing procedure frame at the next level of the generic framing procedure hierarchy,
  wherein information enabling the size of the generic framing procedure payload remaining after that frame has been extracted is captured in the header fields of the generic framing procedure frame into which the first frame is encapsulated.

The generic framing procedure header may indicate whether there are more frames left in the mapping hierarchy when de-encapsulating the generic framing procedure frame stack by providing an indicator at each level of the stack hierarchy if at the lower level of the stack there is a generic framing procedure frame to extract.

Another aspect of the invention seeks to provide a method of generating a generic framing procedure hierarchy comprising:
  processing a first generic framing procedure frame to determine the overall length of the generic framing procedure frame;
  mapping the frame into the generic framing procedure payload area of a second generic framing procedure frame at the next level of the generic framing procedure hierarchy,
  whereby information enabling the size of the generic framing procedure payload remaining after that frame has been extracted is captured in the header fields of the generic framing procedure frame into which the first frame is encapsulated, and wherein the generic framing procedure header indicator indicates whether there are more frames left in the mapping hierarchy when de-encapsulating the generic framing procedure frame stack by providing an indicator at level N of the hierarchy that at the N−1 level there is a generic framing procedure frame to extract. The de-encapsulation process comprising running down the generic framing procedure frame stack.

In one embodiment, another indicator in the payload header indicates that there are no more generic framing procedure frames to extract and the hierarchy of generic framing procedure frames is terminated.

Another aspect of the invention seeks to provide apparatus arranged to implement the method aspect, the apparatus comprising:
  a processor arranged to process a first generic framing procedure frame to determine the overall length of the generic framing procedure frame;
  a mapper arranged to encapsulate the first frame into the generic framing procedure payload area of a second generic framing procedure frame at the next level of the generic framing procedure hierarchy, whereby information enabling the size of the generic framing procedure payload remaining after that frame has been extracted is captured in the header fields of the generic framing procedure frame into which the first frame is encapsulated, and wherein the generic framing procedure header indicator indicates whether there are more frames left in the mapping hierarchy when de-encapsulating (i.e., running down) the generic framing procedure frame stack by providing an indicator at level N of the hierarchy that at the N−1 level there is a generic framing procedure frame to extract.

One aspect of the invention seeks to provide an adaptation layer for a carrier network service which enables a plurality of client traffic units (for example, protocol data units (PDUs) to be encapsulated within a single adaptation layer traffic unit, which is in turn encapsulated within the payload area (also referred to as a service data unit) of the carrier network.

When a network node receives a carrier PDU, it is able to process the PDU header to determine if the payload area of the carrier protocol data unit includes an adaptation layer signal. If an adaptation layer signal according to an embodiment of the invention is present it is processed and this enables the position of each client signal PDU encapsulated within the adaptation layer signal payload. This enables an individual client PDU to be extracted from the adaptation payload area within the carrier frame payload area without requiring any of the other client PDUs carried within the same carrier frame payload area to be extracted as well. This enables a carrier frame to carry a variety of client signals in a more versatile manner than is known in the art.

Aspects of the present invention are as set out above and in the accompanying claims, and the preferred embodiments are as set out above and by the accompanying dependent claims.

Those of ordinary skill in the art will find it apparent that the invention may comprise any appropriate combination of the aspects and preferred embodiments as set out herein and in the claims.

BRIEF DESCRIPTION OF THE DRAWINGS

The preferred embodiment of the invention will now be discussed with reference to the accompanying drawings which are by way of example only and in which:

FIG. 2A shows schematically the hierarchical levels of a GFP frame stack according to an embodiment of the invention;

FIG. 2D shows schematically a three-level hierarchy GFP frame stack where the intermediate level and client end of the stack includes a plurality of GFP frames according to an embodiment of the invention;

FIG. 3 shows schematically the GFP stack in more detail according to an embodiment of the invention;

DETAILED DESCRIPTION OF PRESENT EXAMPLE EMBODIMENTS

The best mode of the invention will now be described. Those of ordinary skill in the art will be aware that the description of the invention has been simplified for clarity and may omit to refer explicitly to features which are apparent and already known to those of ordinary skill in the art as essential for its implementation, such features being implicitly included in the description of the invention. The description may also omit to mention alternative features which are functionally equivalent to the features recited herein.

Figure 1:
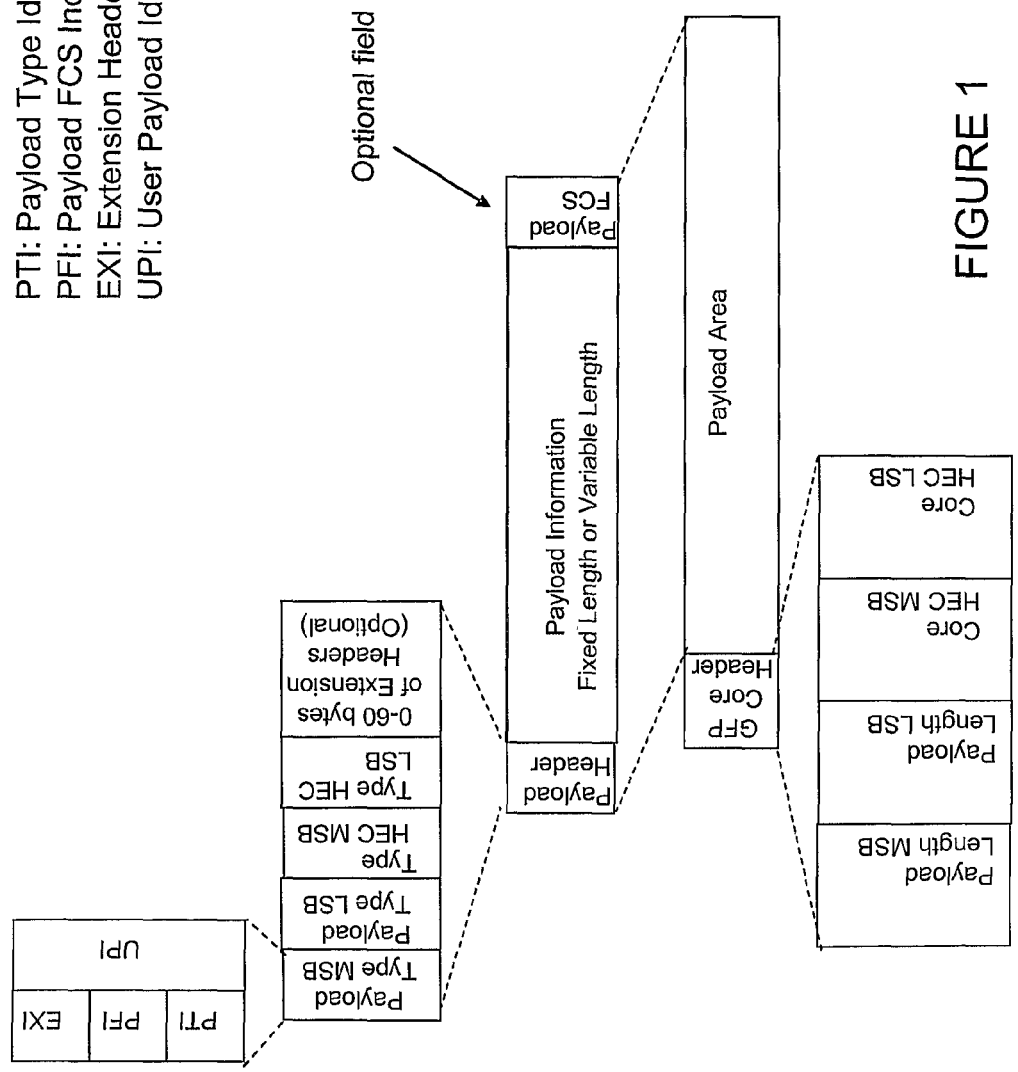
FIG. 1 shows schematically in more detail a standard GFP frame format.

FIG. 1 of the accompanying drawings shows a GFP frame format as known in the art, which can be modified for use as an adaptation layer according to an embodiment of the invention. The GFP frame format has the features of the protocol as defined in the G.7041 standard established by the International Telecommunications Union Telecommunications standardisation sector (ITU-T), the contents of which are hereby incorporated by reference.

Those of ordinary skill in the art will be aware that the GFP protocol was intended as a universal mapping mechanism for packets into TDM technologies. GFP supports multiple protocols and is extensible. The preferred embodiment of the invention uses frame-based GFP, but in alternative embodiments of the invention, transparent GFP (GFP-T) is used. GFP-T is an extension to GFP developed to provide efficient low-latency support for high-speed WAN applications including storage area networks. Rather than handling data on a frame-by-frame (packet-by-packet) basis, GFP-T handles block-coded (e.g., 8B/10B) character streams.

In one embodiment of the invention, a hierarchical GFP mapping scheme provides an adaptation layer for an Ethernet carrier network service. The hierarchical GFP mapping scheme adaptation layer enables a plurality of client signals to be carried within an Ethernet frame, as described hereinbelow and, for example, as described in the applicants co-pending patent application entitled "CLIENT/SERVER ADAPTATION SCHEME FOR COMMUNICATIONS TRAFFIC which claims priority inter alia from GB0724936.0, the full contents of which are hereby incorporated by reference.

As shown schematically in FIG. 1 the structure of a GFP client frame comprises a core header, a payload header, an optional extension header, and an optional payload frame check sequence (FCS). Those of ordinary skill in the art will be aware that fields of the GFP frame which are not relevant in the present context may be omitted for clarity from the diagrams and description below.

The Core Header has a field that has an indication for the payload length which is a 2-byte (8 octet bit) field indicating how many bytes (bit octets) are in the GFP payload area. By subtracting the subsequent payload header and any optionally present payload FCS overhead from the payload area, the payload length value also indicates the size of the true client payload information. The Payload Header is a variable length area and comprises two mandatory fields and optionally, some extension headers. The two mandatory types of fields are the Payload type fields of which the Payload Type Most Significant Byte (MSB) and Payload Type Least Significant Byte (LSB) are shown in FIG. 1 and the header error correction (HEC) fields of which the Type HEC MSB and Type HEC LSB are shown in FIG. 1.

The Payload Type field has multiple subfields. The Payload Type Identifier (PTI) identifies the type of frame and may take two values: user data frames and client management frames. The Payload FCS Indicator (PFI) subfield indicates if there is a payload FCS. The Extension Header Indicator (EXI) subfield indicates the type of extension header in the GFP frame. Three types of type extension headers are known in the art, a null extension header, a linear extension header for point-to-point networks, and a ring extension header for ring networks. Also shown is the User Payload Identifier (UPI) subfield which identifies the type of payload in the GFP frame. The UPI is set according to the transported client signal type, of which several defined values already exist for communication protocols such as Ethernet, PPP, IP, MPLS, Fibre Channel, FICON, ESCON, and Gigabit Ethernet.

The Payload Information Field contains the client data. Two modes of client adaptation are defined for GFP as mentioned hereinabove, frame-mapped GFP and transparent-mapped GFP. Frame-mapped GFP payloads consist of variable length packets and one client frame is mapped in its entirety to one GFP frame. In transparent mapped GFP, a number of client data characters (mapped into block codes) are carried within a GFP frame.

A hierarchical GFP mapping is implemented using the PTI, EXI, and UPI fields according to an embodiment of the invention.

FIGS. 2A, 2B, 2C, 2D and 2E and 3 show schematically how one or more GFP frames can be mapped inside another GFP frame. The mapping process is repeatable to create a hierarchy provided that at each level the mapping is always into a bigger frame in the next level of the hierarchy. If not, then a frame is fragmented into a plurality of small segments which are mapped into a plurality of frames.

Figure 2B:
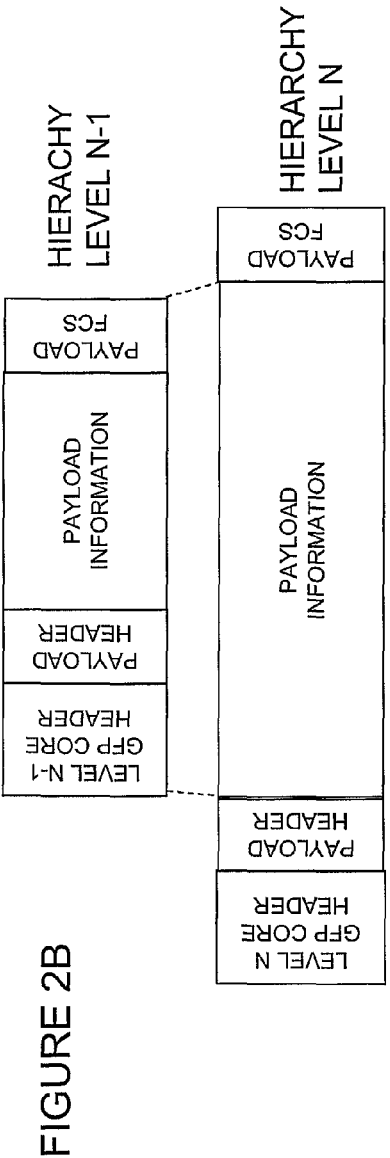
FIG. 2B shows schematically the hierarchical levels of a GFP frame stack shown in FIG. 2A for comparison with FIG. 2C.

As shown in FIGS. 2A and 2B, each GFP frame is stacked within the payload of the GFP frame at a lower level of the hierarchy. As shown in the embodiment of FIGS. 1 and 2A, the payload of each GFP frame at a higher level than the first level (where the payload will comprise client data) comprises the contents of another GFP frame. The lower the level of the GFP hierarchy, the closer the level is to the client layer. In some embodiments of the invention, the client layer may have a higher level than GFP in the Open Systems Interconnection communications protocol stack, but in other embodiments of the invention this need not be the case. For example, a client level can comprise GFP again or Internet Protocol or Asynchronous Transfer Mode to name a few client layer communications protocols for embodiments of the invention. Similarly, the higher the level of the GFP hierarchy, the closer the hierarchy level is to a carrier (or equivalently server) layer. The highest level of frames in the GFP hierarchy will be mapped to the payload of frames in a carrier network in a 1:1 manner, so that the payload in each of highest level frames (level N in FIG. 2B) is then mapped to the payload of a frame conforming to the communications protocol of a network which is offering a carrier service to the network from which the client signals originated. In some embodiments of the invention the carrier (equivalently server) network has a lower level of communications protocol than GFP in the OSI communications protocol stack, but this is not the case in other embodiments of the invention. For example, a carrier network may use one of the GFP, or Ethernet, or MPLS, or ATM communications protocols and variants thereof to name but a few possible carrier network transport technologies.

Figure 2C:
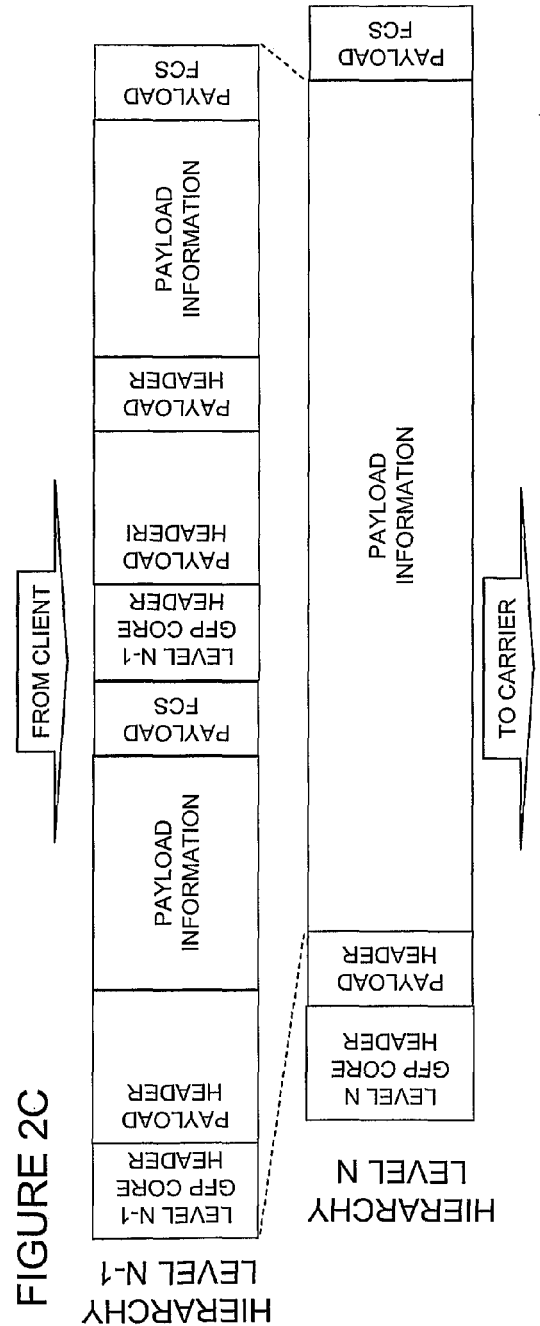
FIG. 2C shows schematically the hierarchical levels of a GFP frame stack where the client end of the stack includes a plurality of GFP frames according to an embodiment of the invention.

FIG. 2C shows how within a single level of the GFP hierarchy it is possible to have a plurality of GFP frames concatenated together. In FIG. 2C, at level N−1 two GFP frames are placed in the payload area of a single GFP frame at a lower level of the hierarchy. The level N−1 frames carry the same client signal in FIG. 2C, but alternatively, the payload of some of the N−1 level frames could originate from one or more different client signals in other embodiments of the invention. In another embodiment of the invention, two or more level N−1 frames carry fragments of the same client frame (or alternatively a level N−2 frame—see FIG. 2D) in which case their headers will also include a fragmentation indicator and sequence information.

FIG. 2D shows schematically a three level GFP hierarchy in which at level 1 four frames are concatenated together within the payload of a single frame at level 2 of the frame hierarchy. The payload of each of the level 2 frames is able to have an internal data structure which is independent of the internal data structure of any other frames also mapped into the payload of the level 3 GFP frame. As shown in FIG. 2D, therefore, the left-hand side level 2 frame has a payload containing four level 1 frames. The right-hand side level 2 frame has no additional internal data structure apart from client data. Both level 2 frames are mapped into the payload area of the level 1 GFP frame. The level 1 GFP frame can then be mapped to the payload area of a carrier network PDU for transportation over a carrier network.

Figure 2E:
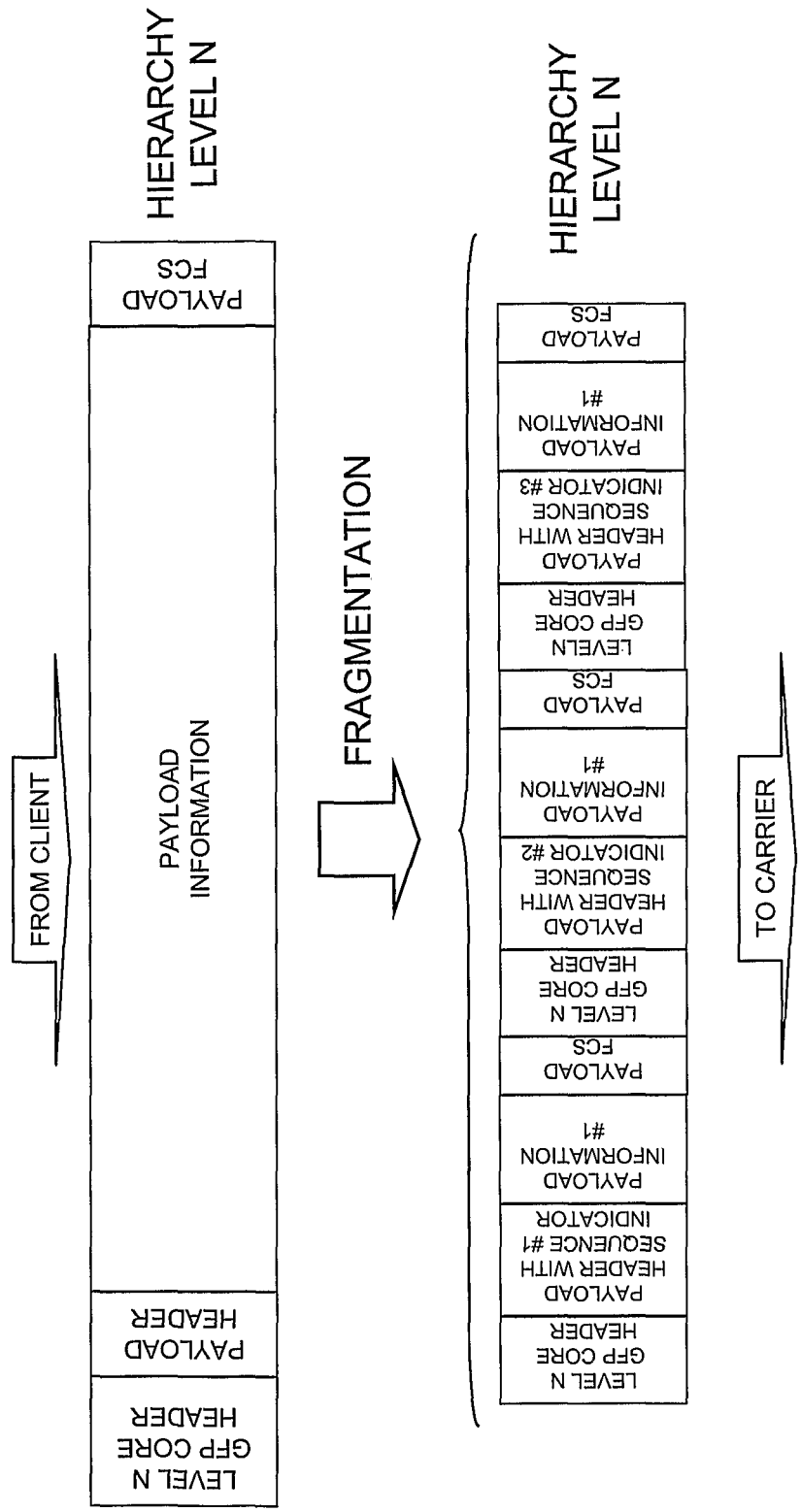
FIG. 2E shows how a frame at level N can be fragmented into a plurality of frames according to an embodiment of the invention.

FIG. 2E shows how in an embodiment of the invention a GFP frame at any level of the GFP hierarchy is able to be fragmented into a number of GFP frames which occupy the same level of the GFP hierarchy. Each GFP frame header is modified to indicate it has a fragmented payload and is provided with a sequence indicator in its extension field, as is described in more detail later herein below. This enables a client signal having a large PDU or data structure to be first mapped to a GFP frame which is then fragmented into a plurality of smaller GFP frames. The smaller GFP frames can then be mapped to an equal number of carrier network frames.

FIG. 3 shows how information from one level of the GFP frame stack is carried by the GFP frame at the next level of the GFP stack. As shown in FIG. 3, the PDU Length Indicator for a GFP frame at a first level is processed to determine how may bit octets (i.e., bytes) will taken up by the encapsulated field being mapped into the GFP payload area at the next level of the hierarchy. This information enables the extraction of the encapsulated protocol data unit for the client traffic signal (which in the embodiment of the invention shown in FIGS. 2 and 3 is another GFP frame) as it allows the size of the GFP payload remaining after that frame has been extracted to be determined during the "de-mapping" process. It also enables any node receiving the signal to determine if there are other GFP frames remaining in the payload area to de-encapsulate. For example, in FIG. 2C, after de-encapsulating the first level N−1 frame from the level N frame payload area, if the entire length of the level N frame payload has not been de-encapsulated, the node performing the de-encapsulation will continue to process the bit stream received on the basis that another N−1 level GFP frame is within the N level GFP payload area.

In addition, the Payload header information of the GFP frame encapsulating the other GFP frame indicates what is being carried and whether it is a GFP frame or something else. To implement the hierarchical GFP mapping, the GFP header indicator indicates whether there are more frames left in the mapping hierarchy when de-encapsulating (i.e., running down) the GFP frame stack. An indicator provided in the header of a GFP frame at level N of a frame stack hierarchy indicates that the de-encapsulation process is to be re-iterated to de-encapsulate the GFP frames from within the payload of the GFP frame that has just been de-encapsulated, i.e., that at the next level there are one or more GFP frames to extract. Any other indicator in the payload header indicates that there are no more GFP frames to extract and the hierarchy of GFP frames is terminated. In one embodiment of the invention, where data from a client communications network (for example, a Local Area Network or LAN) is to be transported over a carrier communications network (for example, a Wide Area Network or WAN) which is using a GFP mapping scheme according to the invention as an adaptation protocol, the payload of the frames in the lowest level of the GFP hierarchy comprises data conforming to a communications protocol supported by the client network.

In one embodiment of the invention, GFP traffic generated in a first network domain is encapsulated within GFP provided by another network domain. This enables traffic provided by a first carrier network to be carried over the network of a second carrier in a transparent manner without requiring a instance of a common control plane.

It is common for GFP to have proprietary extensions and/or mappings which would otherwise cause problems as traffic crosses over network domains. In one embodiment of the invention the requirement to always examine the client traffic at each boundary node between network domains is removed as the GFP protocol stack isolates the proprietary fields of one network domain by carrying them at the next frame level in the GFP frame hierarchy, thus encapsulating the proprietary fields with a GFP frame payload area over the other network domain.

Other embodiments of the invention enable segmentation of client frames within the carrier network as well as concatenation of a plurality of GFP frames (whether they individually carry segments from the same client frame or not providing they can be routing in common over at least part of the carrier network) within another GFP frame which can then be mapped into the carrier frame payload area.

Thus embodiments of the invention provide a data transport scheme in which the payload header and/or the optional extension header are adapted to enable client frames to be carried within carrier frames and everything else can be treated in the normal manner as described in the various GFP standards, such as G.7041 for example, whose contents are incorporated herein by reference.

In one embodiment of the invention, the GFP stack is arranged to enable GFP frame-by-frame multiplexing which is described in more detail hereinbelow. Another embodiment of the invention uses the GFP extension header of a GFP frame to indicate segmentation or concatenation of the GFP frames carried in its the payload.

In these embodiments, the term "carrier" GFP frame indicates the frame within whose payload part or all of a client GFP frame is encapsulated, the term "client" indicating the encapsulated frame or frame fragment, i.e., the relation of each frame within the frame hierarchy. Thus in a three tier hierarchy a frame in the middle layer is a carrier to the first layer and a client of the third layer. Each GFP frame whether client or carrier conforms to the standard GFP communications protocols (e.g. GFP-T, GFP-F, and other variants) and so comprises: a core header, a payload header, a payload area, an optional extension header, and an optional payload Frame Check Sequence. In practice, in many embodiments of the invention, the "client" GFP will itself contain data derived from a client signal and the carrier GFP frame is mapped to the payload or service data unit of a PDU of a carrier network.

A carrier GFP frame has a payload header which is 4-64 bytes long and comprises: a 2 byte type field which is used to implement the invention, a 2 byte header error control (HEC) that ensure integrity of the type field known as the tHEC (which is used in its standard form), an optional extension header which is 0 to 58 bytes long, and an optional 2 byte header error control (HEC) that ensures that the integrity of the optional extension header and is known as the eHEC (if present this is used in a standard form).

The presence of a GFP frame which is encapsulated in the payload of a GFP frame is indicated in the carrier GFP frame by the GFP type field in the payload header and/or the optional extension header.

The payload header supports data link management procedures specific to the client signal being carried (in other words the payload). The payload headers type field is subdivided into a number of fields as follows:

i) A 3 bit payload type identifier (PTI). This identifies the type of GFP client frames. Currently the following are defined: 000 that identifies the frames as being client data (user data frames), 100 for client management frames and other values are reserved for further study. A GFP client data frame is used to transport data from the client signal. The GFP Client Management Frames are used to transport information associated with the management of the client signal or GFP connection.

ii) A 1 bit payload FCS (frame check sequence) indicator (PFI). This indicates the presence (set to 1) or absence (set to 0) of the payload FCS field.

iii) A 4 bit extension header indicator.

iv) An 8 bit user payload identifier (UPI) is used to indicate the type of payload carried in the GFP payload information field.

One embodiment of a method of transporting data according to the invention sets the type field and its subfields to a set of values. In this embodiment, the client data is transported over GFP using the client data frames. These frames are GFP client frames consisting of a Core Header and a Payload Area. The Type field of the client data frames is then set as follows PTI=000,
PFI=Payload specific.
EXI=Payload specific.
UPI=Payload specific.

Whether Frame Check Sequence (FCS) is enabled or not will determine the value that the Payload FCS Indicator (PFI) is set to 1 or 0. The UPI indicates what the client payload is. For example frame mapped Ethernet has a UPI set to 0000 0001. Currently 0001 0011 through to 1110 1111 are reserved for future standardization. So to transport GFP-F over GFP-F it is sufficient to choose either a value reserved for proprietary use (1111 0000 to 1111 1110) or an unallocated value and assign it to represent frame mapped GFP, if instead the GFP client is GFP-T and the carrier service is GFP-F, at least another UPI is required.

The payload Extension Header is intended to support technology specific data link headers such as virtual link identifiers, source/destination addresses, port numbers, Class of Service, extension header error control, etc. The type of the extension header is determined by the content of the EXI bits. Those of ordinary skill in the art will be aware that at the date of the invention three Extension Header variants are defined as follows:

When EXI=0000 the extension header is null. In this case there is no separate extension header and no eHEC. This applies to the case of a point-to-point scenario where it is intended that the transport path is dedicated to one client signal. In such an embodiment, a transport scheme with a two-level GFP frame hierarchy comprises a single GFP stream being supported by the encapsulating GFP. This could for example occur to allow traffic on an incoming port to be encapsulated for transport on an outgoing port in a point-to-point configuration. In such an embodiment, the carrier GFP frame headers will have an EXI=0000 value in the extension field if there is no fragmentation.

When EXI=0001 the extension header is a linear header. It is intended for applications that are linear (i.e, point-to point) and require aggregation of the client signals using the adaptation layer. This is used in embodiments of the invention to indicate GFP multiplexing in the data transport scheme, where more than one client GFP signal is supported by the encapsulating GFP. In this case, the original type field of the carrier GFP headers now comprises:

PTI=000;
PFI=0 or 1;
EXI=0001;
UPI=Payload specific.

In one embodiment, a carrier GFP (level 2 frame) payload has a length limit of N octets. There are M GFP encapsulated client frames (level 1 frame), each of N octets. If a 1:1 mapping is implemented between the carrier (N=2) payload and the client GFP (N=1) frame traffic, then each carrier (level 2) GFP frame's payload carries a single client GFP frame (level 1). In total, M carrier GFP frames will be required to carry the M client signals. If, however, frame sharing is required, for example if a single carrier GFP frame is shared between multiple client frames, i.e., a M:1 client to carrier mapping is implemented, then each carrier frame payload carries M different client payload fragments with each client payload fragment comprising N/M octets. In total however, M carrier frames are still required to send each client N octets (see also FIG. 7 described herein below).

In this case, if the GFP frame is being mapped to a payload information area which is larger than the maximum size of the payload area then some form of segmentation and reassembly mechanism needs to be provided.

This is provided in one embodiment of a data transport scheme according to the invention by providing a new extension header for the carrier GFP frame. In this embodiment, the communications system is considered to be point to point and there is no multiplexing of multiple streams. The data transport scheme maps a stream where some of its frames (but not necessarily all) have a larger size than the encapsulating payload area. If all the client frames are smaller, then of course this type of extension header is not required to implement the invention.

In this case, an EXI value needs to be defined which can be a value taken from one of the currently unused extension headers. The extension header provided has a spare field and a header error check and now comprises 4 bytes of data and provides a means of identifying if an encapsulated frame has been fragmented, if it is the first, middle or last fragment, and provides a sequence number.

Figure 4:
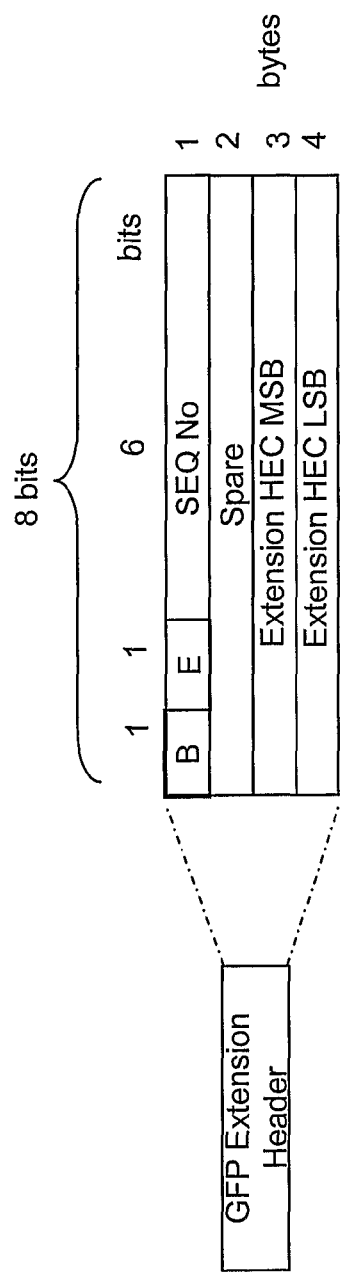
FIG. 4 shows a GFP header extension field according to an embodiment of the invention which provides a data transport scheme which fragments client traffic.

FIG. 4 shows in more detail an exemplary internal structure of such a GFP extension header according to the invention. In FIG. 4, the 4 byte header field is segmented into an 8 bit extension Header Error Check Least Significant Byte (eHEC LSB) field, an 8 bit extension Header Error Check Most Significant Byte (eHEC MSB) field, a spare 8 bit extension header field, a 6 bit Sequence Number field, and two single bit fields, the E-field and the B-field. The E-field and B-field shown are sufficient to indicate what is happening with the fragmentation process or in other words the fragmentation state of the payload. The sequence number indicates the order of the fragments to aid their reassembly when recovered from the carrier service. For example, one could configure E=1, and B=1 to indicate the start of a series of fragments, E=0, B=1 to indicate the end of a series of fragments, and E=1, B=0 to indicate a fragment somewhere in the middle (which would require the sequence number to indicate its correct position), and E=0, B=0 to indicate that no fragmentation is present.

Figure 5B:
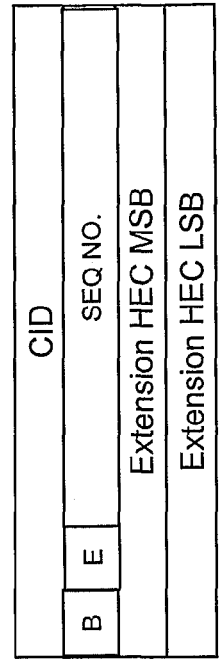
FIG. 5B shows a GFP header extension field according to an embodiment of the invention which provides a data transport scheme for multiplexing and fragmenting client traffic.
Figure 5A:
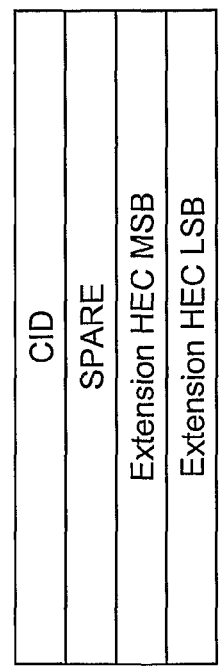
FIG. 5A shows a GFP header extension field according to an embodiment of the invention which provides a data transport scheme for multiplexing GFP client traffic.

FIGS. 5a and 5b both show how a GFP-type extension header is configured in one embodiment of the invention which implements a multiplexing scheme which requires a a channel identifier to be provided. The header in FIG. 5a comprises a CID field or Channel ID field which is one byte long and can therefore identify 256 different communications channels between GFP In the embodiment of the invention shown in FIG. 5A a spare byte is shown in the extension header which is not used but which is used in the embodiment of the invention shown in FIG. 5B where the spare byte is used to support the fragmentation of client frames.

Embodiments of the invention use the CID field of a GFP frame to multiplex multiple GFP sessions, each session being identified by a GFP frame having a CID with a different value. A GFP frame header is 8 bytes long and the payload area is approx 65000 bytes long, it is possible to have multiple GFP sessions multiplexed in an encapsulating GFP frame. The maximum number of sessions which can be multiplexed in this way is 256 although in practice the number is likely to be much smaller than 256, with the practical limit on the number of sessions which can be multiplexed in this way depending on the length of the encapsulated frames being smaller than the length of the encapsulating GFP frames payload information field. By using a CID value and a predetermined UPI in one embodiment of the invention multiple GFP sessions can be carried in the same GFP frame. This enables client traffic to be multiplexed from lower rate ports onto a higher rate port to provide a point-to-point aggregated service.

Figure 6:
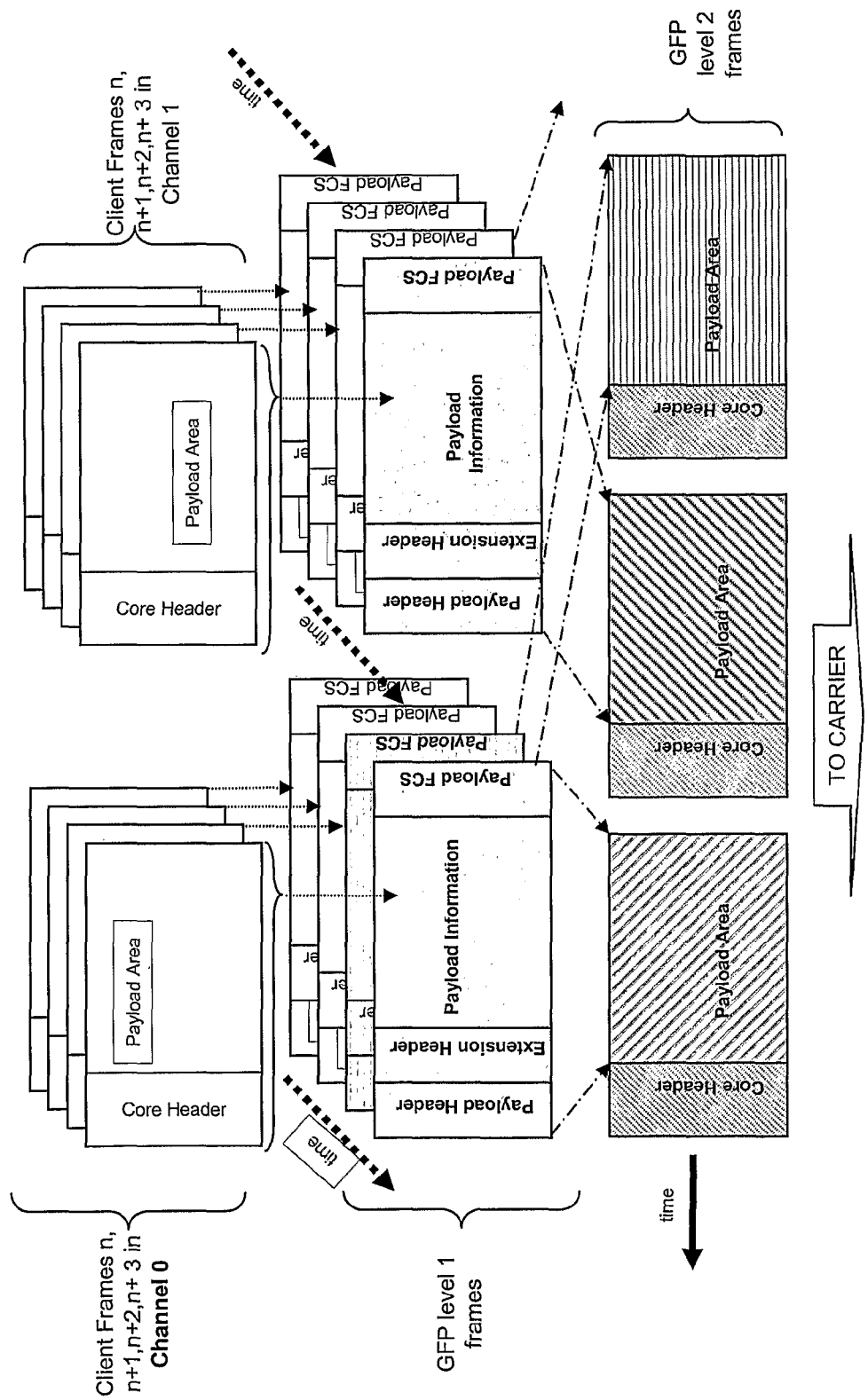
FIG. 6 shows schematically how a plurality of client GFP channels are multiplexed into a single carrier GFP data channel according to an embodiment of the invention.

FIG. 6 shows in more detail how two channels of client frames are mapped to the payload of a carrier channel. In FIG. 6, client frames n, n+1, n+2, and n+3 from channel 0 are shown on the left and client frames n, n+1, n+2, n+3 from channel 1 are shown on the right. Each frame is first mapped to the payload information of a GFP frame, which together with the payload header, extension header and FCS is then mapped to the payload area of the carrier GFP frame. Each client frame is mapped using an extension header such as that shown in FIG. 5A or 5B, i.e., one comprising a channel identifier (CID) value which identifies the payload of the encapsulating GFP frame is associated with a particular channel. In this case, channel 1 is mapped with a CID value which identifies the payload of the carrier GFP frame is associated with channel 1. Channel 2 is similarly mapped using an extension header comprising a CID value which identifies payload associated with channel 2.

In FIG. 6 time flows horizontally in the direction of the arrow at the bottom for the carrier stream and the frames are mapped 1:1 so that in the horizontal flow of frames shown the first frame in the left is from Channel 0, the next is from Channel 1, the next from Channel 0 again. The CID then simply identifies what channel a frame belongs to. If the client GFP frames are smaller or equal to the than the payload information area, then an Extension header having the form shown in FIG. 5A can be used. However, if not, then additional information needs to be captured as described herein above and an extension field such as that shown in FIG. 5B can be used.

The multiplexing process used to map the client frames into payload information and then into the payload area of a stream of GFP carrier frames can be any known multiplexing process known to one of ordinary skill in the art as apparently suitable for this purpose, and similarly the demultiplexing process can be implemented using a known demultiplexing process suitably adapted for the purposes of the invention.

Figure 7:
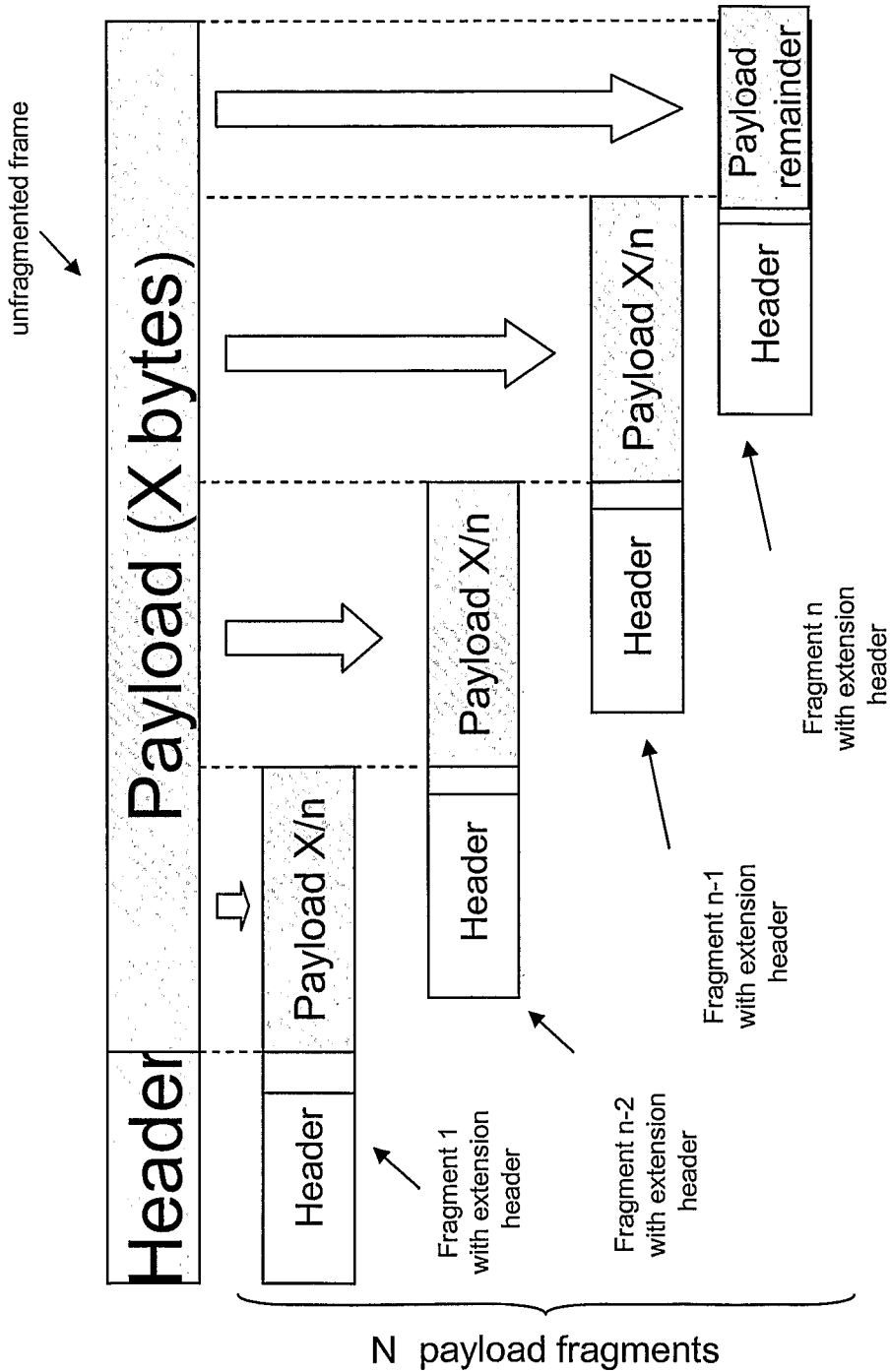
FIG. 7 shows schematically how an unfragmented client GFP data frame is fragmented into a plurality of carrier GFP frames according to an embodiment of the invention.

FIG. 7 shows how frame fragmentation occurs. In FIG. 7 an unfragmented GFP frame comprising X bytes of payload is split into a series of X/n bytes of payload fragments. In FIG. 7, the first fragment of X/n bytes will be carried in a first GFP carrier frame, and all other carrier GFP frames will carry the same size of fragment except for the last carrier GFP frame, which carries the remainder of the payload. So if X=10, and X/n=2 bytes, each of the 5 carrier GFP frames each carry 2 bytes. However, if X=11, and X/n=2 bytes, then the last ($6^{th}$) carrier GFP frame will carry 1 byte.

The invention can be used in a variety of networking scenarios. For example, one embodiment of the invention enables a data transport scheme to be implemented in a communications system comprising a single network and GFP carrier service. Here GFP transport apparatus (for example, line cards) are provided at the edge of the network (for example, in the first and last Synchronous Digital Hierarchy Cross-Connects). The GFP framing appears only at the edge of the location, i.e., at these points, which removes the need to perform any processing within the network.

In another embodiment of the invention a data transport scheme is implemented in a communications system comprising a second GFP carrier which offers a service to the first GFP carrier. Now there are three GFP hops within the communications network, firstly a hop in/out of GFP at the edge and also in the middle between the two GFP carrier services. If GFP-T is performed on the first and last hops and GFP-F is performed in the middle, then as there is more information being transported in each GFP-T frame (as GFP-T supports line codes that include interframe gaps and preamble and frames) than in each GFP-F frame. To map the line code information over, a data transport scheme such as that shown in FIG. 7 can be implemented which fragments a larger GFP-T frame into a plurality of GFP-F frames. Similarly, if the mapping is proprietary on the $1^{st}$ and $3^{rd}$ hop in the network, then in the intermediate hoe the proprietary mapping needs to be maintained which can again be achieved using a data transport scheme according to the invention which implements GFP-in-GFP, i.e., hierarchical or fragmented GFP.

In one embodiment, a communications system uses GFP as an interface to a line system which is not supported underneath by a TDM communications protocol. In this embodiment, a carrier GFP service would have GFP traffic which is processed on each hop in the communications network. All proprietary client GFP traffic is then transported transparently over the network by implementing the data transport scheme according to an embodiment of the invention.

Figure 8A:
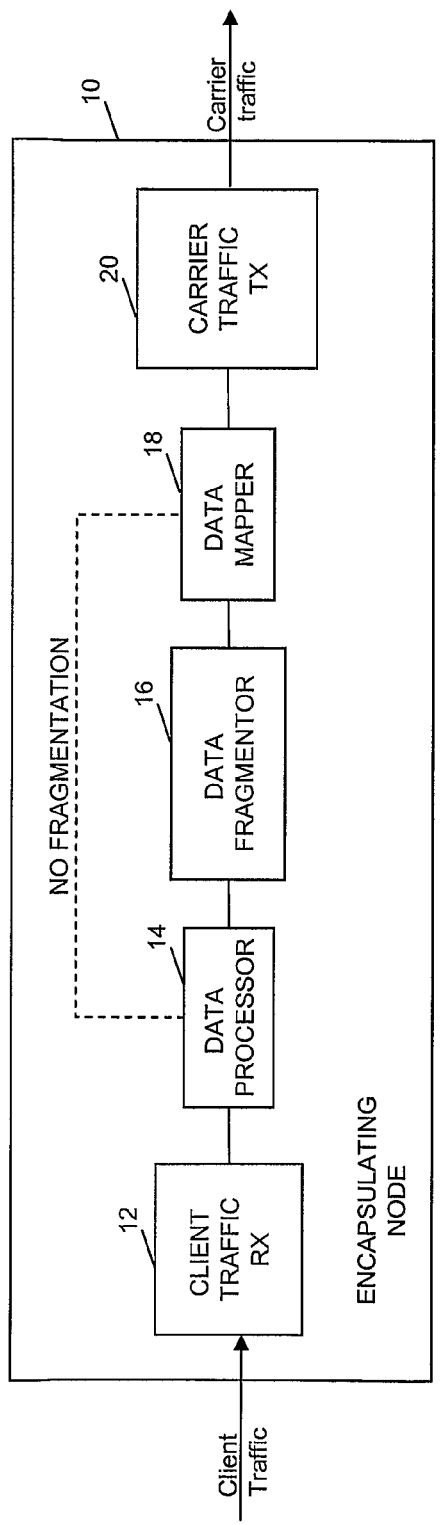
FIG. 8A shows schematically an encapsulating node according to an embodiment of the invention.
Figure 8B:
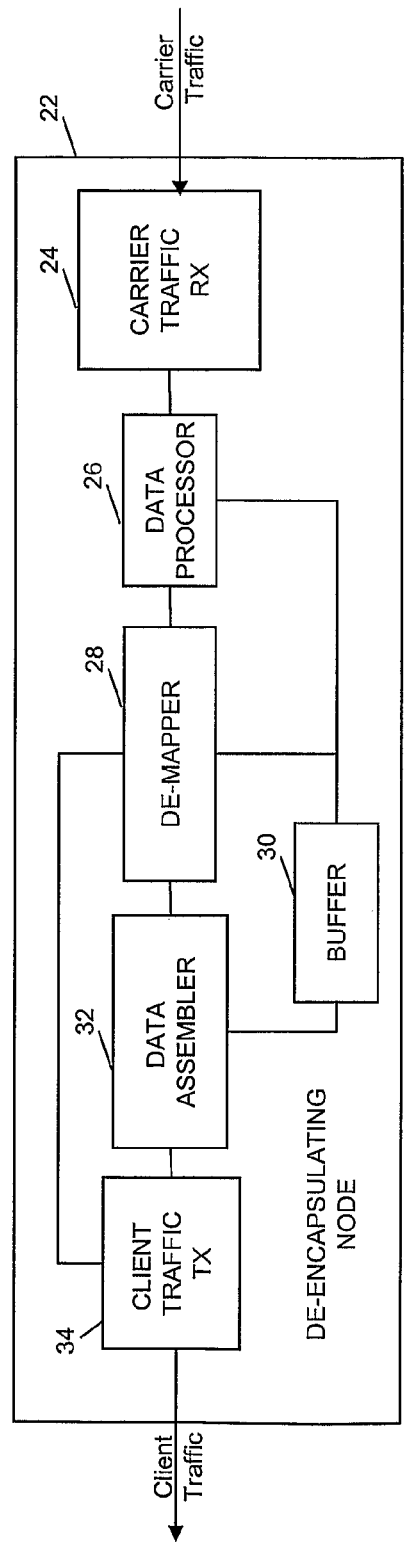
FIG. 8B shows schematically a de-encapsulating node according to an embodiment of the invention.

FIGS. 8A and 8B show schematically some of the functional components required in boundary nodes 10, 22 respectively between a client network (not shown) and a carrier network (not shown) to implement an embodiment of the invention in a communications system. FIGS. 8A and 8B have been greatly simplified. Components which a person of ordinary skill in the art would find apparent as necessary to implement an adaptation scheme according to an embodiment the invention have been omitted for clarity. The components shown in the figures and described below are for exemplary purposes. In other embodiments they may be removed, combined or substituted for by functional equivalents as are known to persons of ordinary skill in the art.

Figure 9A:
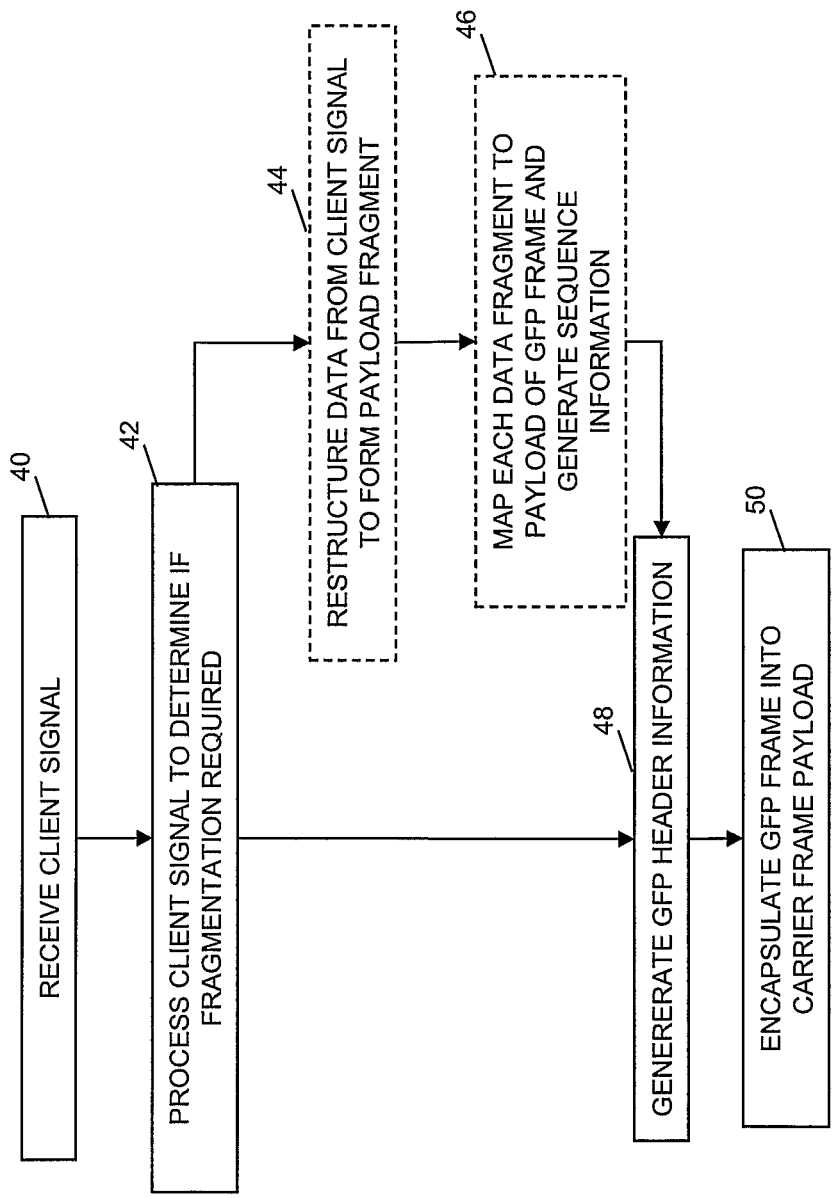
FIG. 9A shows steps in a method of encapsulating client according to an embodiment of the invention.

FIG. 9A shows steps in an embodiment of the invention in which a node such as that shown in FIG. 8A encapsulates client signal data within a carrier frame data structure for transmission over a carrier network.

Figure 9B:
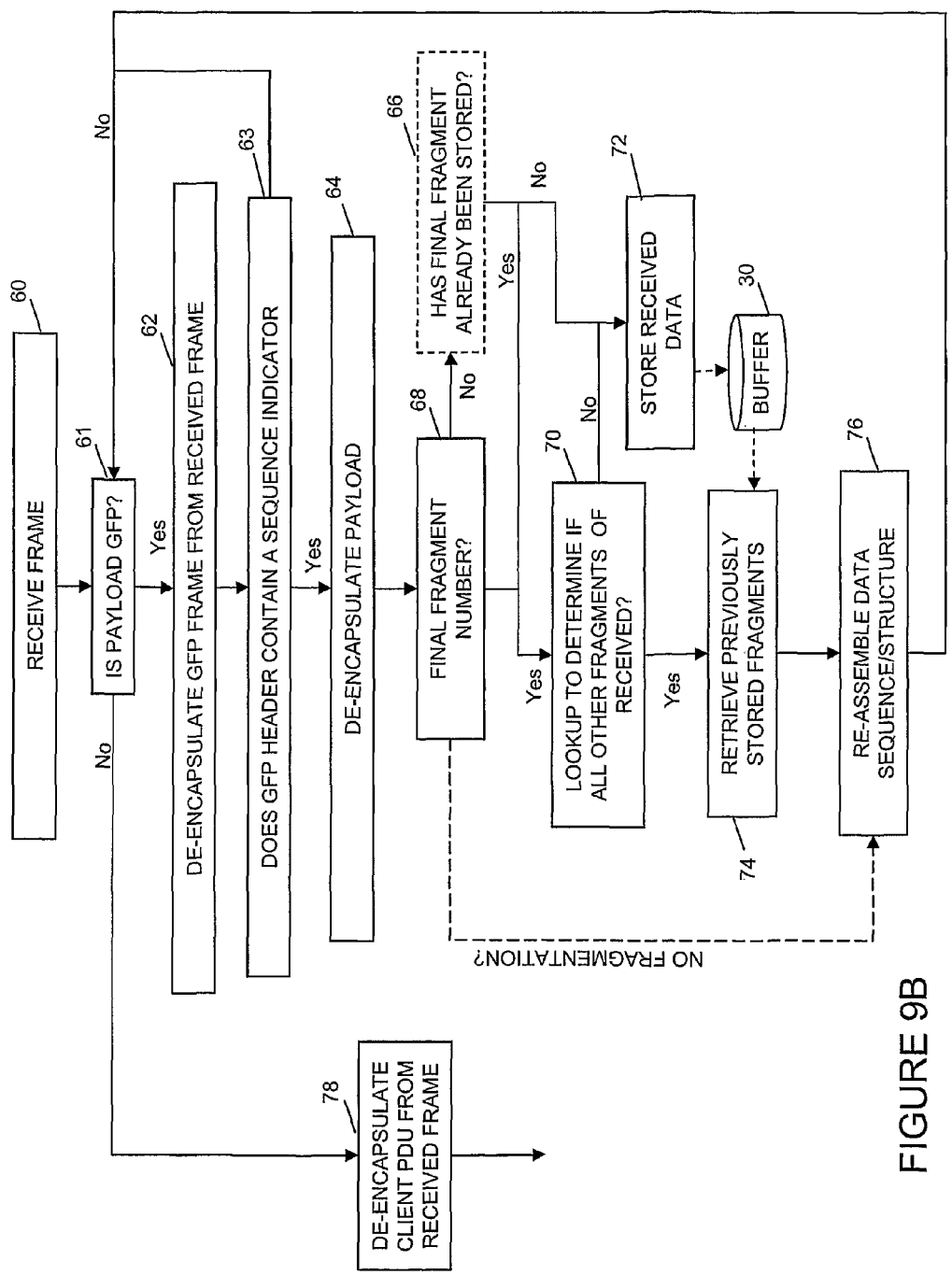
FIG. 9B shows steps in a method of de-encapsulating the payload of a carrier frame according to an embodiment of the invention.

FIG. 9B shows steps in an embodiment of the invention in which a node such as that shown in FIG. 8B de-encapsulates client signal data from within a carrier frame data structure for transmission over a client network.

In FIG. 8A, node 10 functions as a point of encapsulation for client traffic. The receiver 12 of node 10 receives a client traffic signal (step 40 shown in FIG. 9A). Each received client traffic unit is then processed by data processor 14 to determine from its data structure if fragmentation is required (step 42). The processing determines one or more characteristics of the client signal required to map the client signal into one or more GFP adaptation layer frames, for example, the type of client signal communications protocol if this is not the same for all traffic received: the size of the client signal protocol data unit (PDU) and/or SDU routing information etc.

If no fragmentation is required, the entire client PDU is mapped to the payload of the GFP adaptation layer. If the total amount of client data to be mapped to each payload area of a GFP adaptation layer frame is larger than a predetermined amount, for example, an amount which in one embodiment depends on the maximum size of payload supportable by the carrier network PDU which is determined by the size of the service data unit (SDU) of the communications protocol for the carrier network, then the client signal payload is fragmented by data fragmentor 16.

If fragmentation is not required, then the client signal PDU is passed by the data processor 14 directly to the data mapper 18 for encapsulation within the payload area of a GFP frame, and a suitable GFP header is generated. If a plurality of different client signals (for example, client channels or data streams) are to be mapped to a single carrier channel signal for transmission in the carrier network, then each GFP frame will include in its header an indication of the client channel from which its payload was derived.

The GFP frame encapsulating the client signal is then in turn encapsulated by the data mapper 18 either within a carrier GFP frame which is then mapped to the payload area of a PDU for a carrier network for transmission by an appropriate transmitter over the carrier network, or directly into the payload area of the carrier PDU. In this way, where the carrier network is Ethernet, the carrier Ethernet frames are only required to include a GFP Ethertype regardless of the type of communications protocol that the client signal has.

Where fragmentation is to occur, the data forming each client PDU payload fragment is re-structured (step 44). For each client PDU received by mapper 18, the client payload (equivalently client SDU) is mapped along with a copy of the client frame header to the payload of a first level GFP frame and the communications protocol type of the client signal and/or sequence and/or fragmentation data is written to the extension field(s) of the header of that first level GFP frame (steps 46 and 48) in FIG. 9A and as described hereinabove with reference to FIG. 5B). The payload length indicator of the first level GFP frame is also generated.

In one embodiment of the invention, other information required to route the client signal over the carrier network is extracted for use in generating the carrier frame header information.

If more than one first level GFP frame carrying client traffic is to be mapped within the payload of a carrier frame, a plurality of first level GFP frames are mapped to the payload area of a second level GFP frame. This second-level GFP frame is then mapped to the payload area of the carrier network frame by mapper 18 shown in FIG. 8A.

The fragmentation process also enables very large client signals to be fragmented and mapped into a plurality of GFP frame payloads where each GFP frame payload is then mapped to a carrier frame payload area. In this way, a single client frame is fragmented into a plurality of carrier frames suitable for transmission over the carrier network.

Regardless of whether a GFP frame hierarchy according to the invention has one or more levels, it is the lowest level of the GFP frame hierarchy which is mapped to the payload area of the carrier frame (step 50) by mapper 18 for transmission out over the carrier network by transmitter 20.

One specific embodiment of the invention uses a two-level hierarchy of GFP frames to provide an adaptation layer for a carrier Ethernet network which enables a plurality of different client signal payloads to be carried within a carrier Ethernet frame payload area. This assumes that the client signal payloads can be routed along the same path over the Ethernet carrier network so that they can be multiplexed together within the same Ethernet frame payload. Each of the highest level of GFP frames within a carrier Ethernet frame is able to carry a client signal conforming to a different communications type and/or from a different client where the different client signals are able to be transported within the same Ethernet frame. This can enable more efficient transportation of small payload signals such as VoIP over Ethernet for example. The client networks could use the Ethernet communications protocol. In one embodiment, the Ethernet communications protocol is a connection-oriented protocol which enables an Ethernet Wide Area Network carrier service to be provided.

In FIG. 8B, node 22 functions as a point of encapsulation for client traffic. Those of ordinary skill in the art will appreciate that one or components providing the functionality comprising an encapsulating node 10 may also be used to provide functionality for a de-encapsulating node, for example, the same network apparatus may both encapsulate and de-encapsulate client traffic into a GFP adaptation layer into carrier traffic and vice versa.

In FIG. 8B, receiver 24 of node 22 receives a carrier traffic signal (step 60). Each frame of the received carrier signal is processed by data processor 26 to determine if its payload comprises data conforming to the GFP communications protocol (step 61 of FIG. 8B). For example, in an embodiment where the carrier network utilises an Ethernet communications protocol, the header of each carrier Ethernet frame is processed to determine if the value in the Ethertype header field indicates the payload area contains data conforming to the GFP communications protocol. If so, a GFP frame is then de-encapsulated from the carrier frame payload (step 62) by de-mapper 28.

The GFP frame is then processed by data processor 26 to determine from the GFP header if the GFP frame contains any channel, sequence or fragmentation indicators (step 63) and the payload is de-extracted (step 64).

The sequence indicator and one or more other GFP frame headers may then be processed to determine if the sequence number indicates the GFP frame contains the "nth" payload segment or "nth" client frame in a sequence of 1 to n GFP frame payloads (step 68) and if a channel indicator is present, the channel to which the client signal data was derived.

If the payload of the de-encapsulated frame is the nth segment in a sequence of n segments, then a check is performed to see if all of the other 1 to n−1 GFP frame payloads have already been received and are stored in buffer 30, if so the other n−1 payloads are retrieved from buffer 30 (or other suitable memory means) (step 70). If not all of the other frame payloads required to reassemble the original sequence or data structure have been received then the payload of the nth GFP frame is also stored (step 72) in buffer 30.

If the received frame is not the nth frame, a check is performed to see if the nth frame has already been stored (step 66) in buffer 30, if not, the received frame is stored (step 72) in buffer 30.

If the payload of the nth frame has already been received, a further check is performed to see if the payloads of all n−1 frames required to restore the data sequence/structure have now been received (step 70). If so, all previously stored payloads (step 74) are retrieved. The retrieved payloads are then reassembled (step 76) by data assembler 32. If the reassembled data also forms a GFP frame, a check is performed to see if its payload data is also GFP (step 61). If so, the process re-iterates until finally the reassembled data forms a client layer PDU (step 78).

Once a client PDU has been recovered from the carrier network signal it can be transmitted out over a client network by client traffic transmitter 34.

Where a sequence indicator is present in the extension field of the GFP header, it indicates that the node receiving that GFP frame needs to restore a predetermined sequence of GFP frame payloads to recover the original client signal integrity. This either comprises reassembling the original sequence of client signal frames which were mapped into GFP by an encapsulating node 10 or reassembling data to form another PDU (either GFP or of the client signal if the client signal was fragmented at the encapsulating node or an intermediate node).

In FIG. 8B, if a sequence indicator is found but the payload is not formed from fragmenting a client layer PDU, the de-encapsulated contents need only to be buffered sufficiently to restore the original sequence of PDUs forming the client signal as shown by the dashed line between steps 68 and 76 in FIG. 8B.

Where a channel indicator is present in the extension header of the GFP frame being de-encapsulated, the data assembler restores the payload derived from that frame to the client channel from which it was derived (and if fragmented ensures that all fragments are reassembled into a client PDU which is restored to the correct client signal channel). Each client channel signal is then forwarded to the transmitter 34 for onwards transmission in the appropriate manner (which may involve different communications protocols in some embodiments of the invention).

A client signal can be fragmented either directly into GFP or indirectly by mapping the client signal in its entirety into a GFP frame and then fragmenting the GFP frame.

Those of ordinary skill in the art will be aware of modifications and functional equivalents to those described in the above embodiments of the invention, and the scope of the claims should be interpreted to include such variations to the described embodiments where they are apparent to one of ordinary skill in the art.

Although explicit reference is made hereinabove to the GFP communications protocol, any communications protocol which provides equivalent functionality essential to implement the claimed invention may be used whether a standard variant or not of a current standard GFP communications protocol.

What is claimed is:

1. A machine-implemented method of client data transportation in a carrier Ethernet communications system, the method comprising use of at least one data processor to perform method steps comprising:
   receiving, at a node, a generic framing procedure communications protocol frame carrying as payload a type of communications protocol client data; and
   mapping, using the data processor, the received generic framing procedure frame carrying said client data to the payload area of one or more carrier generic framing procedure communications protocol frames;
   wherein data comprising a plurality of said carrier generic framing procedure communications protocol frames is encapsulated within the payload area of a single Ethernet protocol data unit for transport in said carrier Ethernet communications system, whereby the hierarchical encapsulation of said generic framing procedure frames provides an adaptation layer for client data conforming to a plurality of different communications protocols for transport over said carrier Ethernet communications system.

2. A method as claimed in claim 1, wherein the carrier Ethernet protocol comprises a connection-oriented Ethernet communications protocol.

3. A method as claimed in claim 1, wherein a generic framing procedure frame which is mapped to the payload area of the carrier Ethernet protocol data unit comprises a header having an extension field arranged to indicate the fragmentation status of its payload and the sequence number of a payload fragment.

4. A method as claimed in claim 1, wherein a generic framing procedure frame which is mapped to the payload area of the Ethernet protocol data unit comprises a header having an extension field arranged to indicate a channel identity of its payload.

5. A method as claimed in claim 4, implemented on a node in a Ethernet carrier communications network arranged to provide an aggregation service to multiplex client traffic received from lower rate ports to a carrier network accessed through one or more higher rate ports of the node, the method comprising:
   receiving client traffic conforming to one or more communications protocols from a plurality of lower rate ports,
   mapping the client traffic into the payload area of one or more of said client generic framing procedure communications protocol frames;
   wherein each client generic framing procedure frame is mapped to the payload area of a generic framing procedure communications protocol carrier frame having an extension field indicating the channel number of its payload, and each carrier generic framing procedure frame is mapped to the payload area of an Ethernet protocol data unit of the Ethernet carrier network.

6. A method of restoring client data which has been adapted for transportation in an Ethernet carrier communications system using the method as claimed in claim 1, the method of restoring comprising:
   processing at a node in said communications system a received carrier Ethernet frame to determine if its payload comprises a frame conforming to a generic framing procedure communications protocol; and
   if the payload is a generic framing procedure communications protocol frame:
      i) de-encapsulating the payload;
      ii) processing the header fields of the de-encapsulated generic framing procedure frame; and
      iii) determining if the payload further comprises one or more generic framing procedure communications protocol frames, and if so,
      repeating the above steps i) to iii).

7. A method as claimed in claim 6, further comprising:
   processing one or more extension fields of a header of each de-encapsulated generic framing procedure frame to determine if a channel identifier is present indicating the channel identity of the client signal from which the payload is derived.

8. Apparatus comprising one or more components arranged to implement steps in a method as claimed in claim 1.

9. A method as claimed in claim 1, wherein said adaptation layer enables client data comprising a plurality of different communications protocols to be encapsulated within the payload of a single Ethernet frame.

10. An apparatus for adapting client data for transportation in a carrier Ethernet communications system, the apparatus comprising:
   a node configured to receive a generic framing procedure communications protocol frame carrying as payload a type of communications protocol client data; and
   a processor configured to map the received generic framing procedure frame carrying said client data to the payload area of one or more carrier generic framing procedure communications protocol frames;
   wherein data comprising a plurality of said carrier generic framing procedure communications protocol frames is encapsulated within the payload area of a single Ethernet protocol data unit for transport in said carrier Ethernet communications system, whereby the hierarchical encapsulation of said generic framing procedure frames provides an adaptation layer for client data conforming to a plurality of different communications protocols for transport over said carrier Ethernet communications system.

11. The apparatus as claimed in claim 10, wherein the carrier Ethernet protocol comprises a connection-oriented Ethernet communications protocol.

12. The apparatus as claimed in claim 10, wherein a generic framing procedure frame which is mapped to the payload area of the carrier Ethernet protocol data unit comprises a header having an extension field arranged to indicate the fragmentation status of its payload and the sequence number of a payload fragment.

13. The apparatus as claimed in claim 10, wherein a generic framing procedure frame which is mapped to the payload area of the Ethernet protocol data unit comprises a header having an extension field arranged to indicate a channel identity of its payload.

14. The apparatus as claimed in claim 10, wherein said adaptation layer enables client data comprising a plurality of different communications protocols to be encapsulated within the payload of a single Ethernet frame.

* * * * *